July 23, 1963  L. J. GOLDBERG  3,098,949
CONTROLLED RECTIFIER D.C. SWITCHING CIRCUIT
Filed May 20, 1960  2 Sheets-Sheet 1

Inventor
Leon J. Goldberg
by Charles W. Helzer
His Attorney

July 23, 1963 L. J. GOLDBERG 3,098,949
CONTROLLED RECTIFIER D.C. SWITCHING CIRCUIT
Filed May 20. 1960 2 Sheets-Sheet 2

Inventor:
Leon J. Goldberg,
by Charles W Helzer
His Attorney.

United States Patent Office 3,098,949
Patented July 23, 1963

3,098,949
CONTROLLED RECTIFIER D.C. SWITCHING CIRCUIT
Leon J. Goldberg, Schenectady, N.Y., assignor to General Electric Company, a corporation of New York
Filed May 20, 1960, Ser. No. 30,484
7 Claims. (Cl. 317—33)

The present invention relates to an electronic switch. More specifically, the invention relates to a fast acting, non-arcing, direct current, static electronic switch which has no current carrying moving parts, and which is capable of providing instantaneous overload current protection within microseconds after sensing an overload condition so that it can be used as a reliable current limiting device. Additionally, the new and improved current limiting switch can be readily modified to provide any one of a number of control circuits by appropriate connection to a suitable actuating element, and can be easily modified to provide inverse time overload current protection.

The need for greatly improved direct current circuit breakers and switching devices in the circuit breaker art has long been recognized. Known direct current circuit breakers and switching devices for the most part utilize mechanically movable contacts in their main current carrying branch to turn on, or interrupt current flow through the circuit. Interruption of current flow with apparatus of this type causes arcing between the movable contacts with consequent eroding of the contacts in a manner that ultimately affects the operation of the device. Further, the time response of known switching devices of this nature is not sufficiently fast to allow their use as a practical current limiting element in a circuit. Additionally, such current limiting devices as are presently available to the industry, are constructed in a manner such that they do not afford current limiting protection to a sufficient degree in the event that an overload condition exists at the instant the current limiting device is switched into operation.

It is therefore a primary object of the present invention to provide a new and improved direct current static electronic switch that does not employ mechanically moving parts in its load current carrying branch, and which is capable of being switched on or off instantaneously in a matter of microseconds.

Another object of the invention is to provide a direct current electronic switch having the above set forth characteristics which can be used as a current limiting device in a circuit, and which is precharged so that the switch is capable of affording current limiting protection simultaneously with being placed in operation.

A still further object of the invention is to provide a direct current, static electronic switch of the above type which can be easily incorporated into any one of a number of different control circuits by connection to appropriate actuating elements. Additionally, it can be modified to provide inverse time overload current protection, and can be designed to overcome any undesirable effects due to chatter of movable switch contacts.

In practicing the invention a switching circuit is provided which includes in combination of a pair controlled rectifiers each having control gate elements. The pair of controlled rectifiers are adapted to be connected in parallel circuit relationship across a source of electric energy with a suitable load device being connected in series with a first one of the controlled rectifiers. A charging circuit is provided which includes a quenching capacitor that is connected to a precharging circuit, and in circuit relationship with both controlled rectifiers so that it diverts current from the load current carrying rectifier upon the second controlled rectifier being turned on. In order to isolate the load from the quenching device an isolating device is connected in the last mentioned series circuit for isolating the quenching capacitor from the load during normal On operation periods of the circuit. An On triggering circuit is coupled to the gate elements of the first controlled rectifier for switching the circuit to its On condition, and an Off triggering circuit is coupled to the gating element of the remaining controlled rectifier for turning On the remaining controlled rectifier, and thereby turn the switch to its Off condition. The Off triggering circuit also includes means for gating on the isolating device in response to the Off triggering circuit being actuated. An overload sensing transducer is connected in series circuit relationship with the load device for sensing an overload condition. Also, if desired, a thermally sensitive element may be thermally coupled to sense a prolonged overload current for turning off the switching circuit in response to such a condition. In circuit including a thermally sensitive, element, this element is electrically coupled to the control gate elements of the remaining controlled rectifier, and to the isolating device used to isolate the load from the quenching capacitor.

Other objects, features and many of the attendant advantages of this invention will be appreciated more readily as the same becomes better understood by reference to the following detailed description, when considered in connection with the accompanying drawings, wherein.

Figure 1:
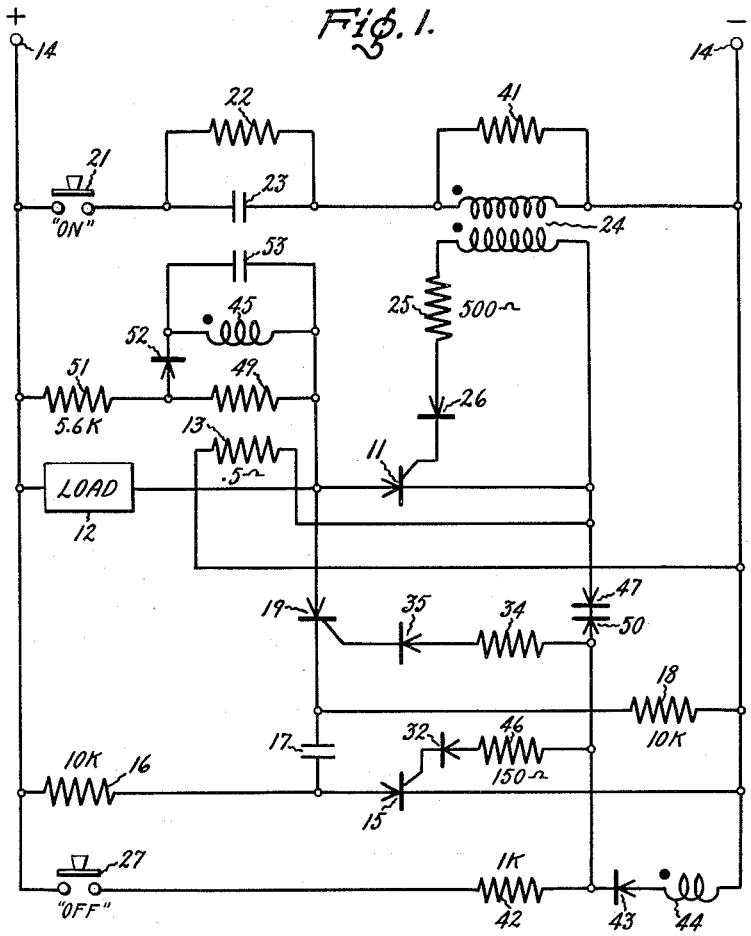
FIGURE 1 is a schematic circuit diagram of a new and improved electronic switch constructed in accordance with the present invention.

The particular switch shown in FIGURE 1 includes a first silicon controlled rectifier 11 connected in series circuit relationship with a load device 12 and a small overload sensing impedance 13 (the purpose of which will be explained more fully hereinafter). This series circuit is connected between a pair of input terminals 14 that are adapted to be connected across the terminals of a suitable power source such as 120 volt direct current supply. It is to be understood that the particular value of the energizing source may be varied from circuit to circuit depending upon the size of the elements used which of course must be designed to accommodate the particular power levels to be switched. The controlled rectifier 11 is a new circuit element recently introduced by the General Electric Company's Semiconductor Products Department, and comprises a PNPN semiconductor that forms three rectifying junctions. Conduction through the controlled rectifier is initiated by application of a small control signal to a control gate element which causes avalanche breakdown of the center rectifying junction. This avalanche breakdown occurs at speeds approaching a microsecond, and after breakdown the voltage across the device is very low so that the current through it is essentially determined by the load to be supplied. Accordingly, it can be appreciated that the controlled rectifier functions in much the same fashion as the grid controlled gaseous thyratron in that a small signal applied to the control grid of the thyratron likewise causes it to break down and to conduct large load currents. Similar to the grid controlled gaseous thyratron, after breakdown, the controlled rectifier control gate element normally loses control over conduction through the rectifier so that it must be commutated or quenched in order to discontinue current flow through the device.

For the purpose of quenching or commutating rectifier 11, a second controlled rectifier 15 is provided. The second controlled rectifier 15 is connected in series circuit relationship with a dropping resistor 16 across the terminals of the source of electric energy, and may be identical to the controlled rectifier 11; however, for most purposes the controlled rectifier 15 will be required to handle switching currents for only a short period, and hence, may have a smaller rating. As previously mentioned, in order to discontinue the current flow through the main load current carrying silicon controlled rectifier 11 it is necessary that the current flow through this device be quenched, i.e., the value of the current through the rectifier be reduced below some minimum holding value for a period of time sufficient to allow the rectifier to reassume its blocking condition. For this purpose, a quenching or commutating capacitor 17 is provided, which is connected in circuit relationship with the first controlled rectifier 11, and with the second controlled rectifier 15 so that a closed discharge path is provided for the quenching capacitor 17 for diverting load current from the rectifier 11. The quenching capacitor 17 is included in a precharging circuit formed by the voltage dividing resistor 16, and a second voltage dividing resistor 18 connected in series circuit relationship across the terminals 14. By this arrangement, upon the switching circuit being connected to a source of electric energy, the quenching capacitor 17 will be precharged to a value determined by the potential of the electric energy source, the values of the voltage dividing resistors 16 and 18, and the value of the leakage current through controlled rectifier 15.

In order to isolate the quenching capacitor 17 from the load 12, and thereby maintain the charge on capacitor 17 during periods of normal On operation of the switch, an isolating device formed by a third controlled rectifier 19 is provided. The third controlled rectifier 19 is connected in the quenching circuit formed by the quenching capacitor 17 and controlled rectifiers 11 and 15, with the controlled rectifier 19 being connected between the negative side of the load 12 and the quenching capacitor 17.

To place the switching circuit of FIGURE 1 in operation, an On triggering circuit is provided which is connected to the control gate element of the first controlled rectifier 11. The On triggering circuit includes a pushbutton switch 21 connected in series circuit with a parallel connected resistance 22 and capacitance 23. The parallel resistance-capacitance 22, 23 together with the primary winding of a pulse transformer 24 and parallel connected resistor 41 comprises a pulse forming network which functions to develop a short duration pulse of electric energy upon the pushbutton switch 21 being closed which is supplied through a pulse transformer 24. The secondary winding of the pulsing transformer 24 is connected in series circuit with a limiting resistor 25 and a protective diode 26 between the negative terminal side of the switching circuit, and the control gate element of the first controlled rectifier 11.

Once the direct current static switch has been placed in operation as described above, to discontinue current flow through the load 12 and hence to the switching circuit, it is necessary to provide an Off triggering circuit. The Off triggering circuit is formed by a second pushbutton switch 27 connected through a voltage dividing resistor 42, a limiting resistor 46, and a protective diode 32 to the control gate of the second controlled rectifier 15. The pushbutton switch 27 is also connected through resistor 42, a second limiting resistor 34, and a protective diode 35 to the control gate of the third controlled rectifier 19, and constitutes the means for gating On the isolating device formed by the third controlled rectifier 19. By this arrangement, upon the Off triggering circuit being actuated by depressing the Off pushbutton 27, a positive potential will be supplied to the control gate elements of the two controlled rectifiers 15 and 19 to render these devices conductive.

In addition to the above connection, the control gate elements of the silicon controlled rectifiers 15 and 19 are also connected through an isolating diode 47 and a Zener diode 50 across the small overload sensing resistor 13 connected in series relationship with the first controlled rectifier 11 and the load 12. By this arrangement, in the event of an overload current an error potential will be produced instantaneously across the overload sensing impedance 13 which is supplied as a triggering potential to the control gate elements of both of the controlled rectifiers 15 and 19. As a consequence, the controlled rectifiers 15 and 19 will be gated On, and thereby immediately shut down the D.C. static electronic switch in the presence of the overcurrent condition.

It should be noted that the overload current sensing resistor 13 is physically disposed adjacent a second resistor 49 which is a thermally sensitive resistor. The thermally sensitive resistor 49 comprises a thermal analog representative of the total safe power that can be supplied in a given period of time to a device being protected by the switch. Other analogs could of course be used. The resistor 49 is connected in series circuit relationship with a voltage dividing resistor 51 to the positive terminal of the direct current supply. The remaining terminal of resistor 49 is connected through controlled rectifier 11 and overload sensing impedance 13 to the negative terminal of the direct current supply source. The resistor 49 in effect comprises a part of a pulse-forming network that further includes the primary winding 45 of a pulse transformer whose secondary winding 44 is connected through an isolating diode 43 to the control gate elements of the two controlled rectifiers 15 and 19. The primary winding 45 has a capacitor 53 connected in parallel circuit relationship with it, and the parallel circuit thus formed is connected across the thermally sensitive resistor 49 through a four layer bistable diode 52, that exhibits the characteristic of breaking down and conducting only when the applied potential across it has achieved some preset breakdown value. The pulse forming network thus comprised operates to develop a triggering pulse upon the thermally sensitive resistor 49 having its impedance increased above a predetermined level due to the continued existence of an overload current in the overload current sensing resistor 13 over some limited period. Such overload current produces heat which will cause the resistance of the thermally sensitive resistor 49 to change sufficiently to increase the potential on diode 52 to cause it to break down and become conductive to produce a triggering pulse in the primary winding 45 of the pulse transformer 45, 44. Upon this occurrence a triggering pulse will be induced in the secondary winding 44 of the pulse transformer which will be connected through the isolating diode 43 to the control gate elements of each of the controlled rectifiers 15 and 19. It should be noted, that before the thermally sensitive resistor 49 will be heated sufficiently to change its impedance to produce a trigger pulse through the primary winding 45, a certain time period will elapse.

This time period can of course be controlled by controlling the characteristics of the thermally sensitive resistor 49, and the charging capacitor 53 and diode 52, and can be adjusted to provide the amount of inverse time current overload protection desired. In this manner, overload current can be allowed to pass through the overload current sensitive resistor 13 for a preselected period prior to actuation of the Off triggering circuit through the effect of the thermally sensitive resistor 49 and its associated pulse-forming network and pulse transformer 44, 45. It should be understood that the overload current value for which the thermally sensitive resistor 49 is operative to trigger Off the switching circuit is considerably lower than the overload current which will effectuate instantaneous overload current protection. For example, an overload current of say 12 amperes through the overload current sensing resistor 13 will be operative to trigger Off the controlled rectifiers 15 and 19 instantaneously. In contrast, an overload current having a value of 9 amperes will not provide instantaneous overload current protection, but if continued over the predetermined period, for example some 5 minutes, will heat the thermally sensitive resistor 49 sufficiently to actuate the pulse-forming circuit to turn on the controlled rectifiers 15 and 19 and turn off rectifier 11.

In constructing the switch shown in FIGURE 1, the circuit elements may have the values shown, however, it is to be understood that the invention is by no means restricted to construction with components having the precise value indicated. Additionally, inclusion of certain of the elements is optional in that the circuit can be operated satisfactorily without them. For example, the Zener diode 50 is included in the circuit to allow for variation within tolerance limits of the values of resistance of resistors 34 and 46 and of the gate characteristics of controlled rectifiers 15 and 19. Under such circumstances the Zener diode 50 assures that potentials developed across the overload current sensing resistor below the value set for instantaneous overload protection, are not supplied to the control gate elements of the controlled rectifiers 15 and 19. If such variations in value are more closely controlled, then the Zener diode 50 may be omitted. Further it is believed obvious that both the "On" switch 21 and "Off" switch 27 can be mechanically opened or closed in response to any desired control phenomena. Should it prove necessary, additional "On" or "Off" switches can be added together with appropriate connections to the control gates of the controlled rectifiers 11, 15, and 19, respectively, by simply duplicating the arrangement shown for whatever additional control functions are required.

In order to place the electronic switch shown in FIGURE 1 in operation, the pushbutton switch 21 is depressed to cause the pulse-forming circuit comprised by the parallel resistor 22 and capacitor 23 to produce a short current pulse across the primary winding of the pulse transformer 24. This short current pulse will then induce a triggering pulse in the secondary winding of the pulse transformer which is supplied through the limiting resistor 25, and protective diode 26 to the control gate of the controlled rectifier 11. As a result, the controlled rectifier conducts, and allows current to flow through the load device and through the small overload current sensing resistor 13. During the normal On operation of the switch, the third controlled rectifier 19 serves to isolate the quenching capacitor 17 from the positive side of the line. The need for such isolation can be appreciated from the fact that prior to switching on the first controlled rectifier 11, the quenching capacitor 17 will be charged to its preset value so that in the event that an overload condition exists at the time that the triggering circuit is turned On, the quenching capacitor 17 will be fully charged, and can operate to cut off the first controlled rectifier 11 before any damage is done as will be explained hereinafter.

Figure 2:
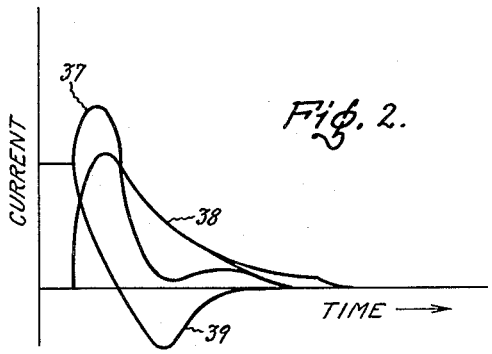
FIGURE 2 is a time vs. current characteristic curve of the circuit of FIGURE 1.

Upon an overload condition being sensed by the overload sensing resistor 13, a positive triggering potential is supplied through diodes 47 and 50 to the control gate elements of both the second and third controlled rectifiers 15 and 19. Upon the two controlled rectifiers 15 and 19 being gated on, the charge on the quenching capacitor 17 will divert the load current flow through the first controlled rectifier 11 so as to drop its emitter-collector potential sufficiently to quench conduction through the rectifier. The current vs. time characteristic of the series circuit formed by the three controlled rectifiers and the quenching capacitor 17 is illustrated in FIGURE 2 of the drawings. Referring to FIGURE 2 the current through the load 12 is illustrated at 37 at the instant after the second controlled rectifier 15 is gated on. The current through the controlled rectifier 15 is illustrated at 38, and the current through the controlled rectifier 11 is illustrated at 39. From an examination of this figure it can be appreciated that a reverse current due to quenching capacitor 17 actually does flow through the first silicon controlled rectifier 11 for a period of from 8 to 10 microseconds which is sufficient to reduce the total load current below the minimum holding value for a long enough time period for the rectifier 11 to regain its blocking condition. It should be understood that for this purpose, the resistor 16 is sufficiently large to assure that current through rectifier 15 is below holding value. Should it be desired to turn off the switching circuit either by an operator or in response to some control signal, the pushbutton 27 is closed either manually or by a solenoid (not shown) actuated by the control signal. This results in producing a positive voltage pulse that is supplied through the limiting resistors 46 and 34 to the control gate elements of the second controlled rectifier 15 and the third controlled rectifier 19, respectively. Upon these two controlled rectifiers being gated On the charge on quenching capacitor 17 will cause a reverse current flow through the first silicon controlled rectifier 11 to turn off the rectifier in an identical manner as described previously. During the switching Off operation, whether it be due to an overload current condition or whether the Off triggering switch 27 has been closed, the protective diode 26 serves to protect the triggering On circuit from transient effects in the circuitry. Similarly, during the triggering On operation, the two protective diodes 32 and 35 block any gate currents that might flow in the gate circuits of the controlled rectifiers 15 and 19.

Figure 4:
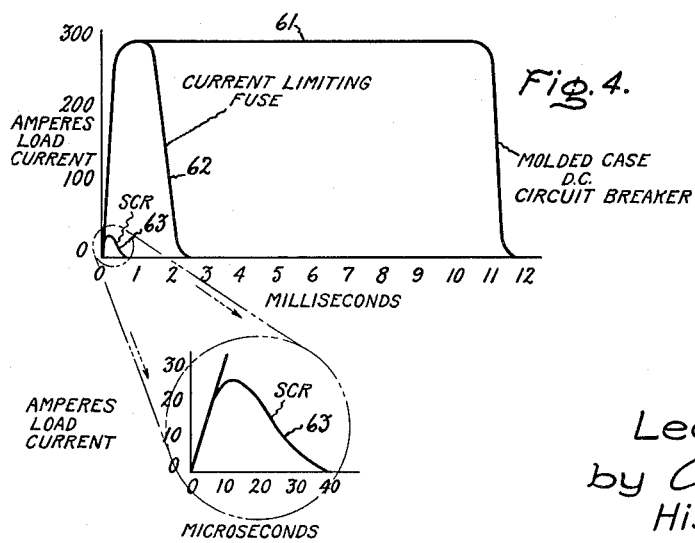
FIGURE 4 is a graph of the current-time switching characteristic of the new and improved electronic switch comparing the same characteristic of similar devices.

The current-time switching characteristic of the new and improved controlled rectifier switch is illustrated in FIGURE 4 of the drawings along with the current-time characteristics of presently available devices intended for the same use. In particular, the current-time switching characteristics of a molded case direct current circuit breaker and of a current limiting fuse are illustrated in conjunction with the current-time limiting characteristic for the new and improved controlled rectifier static electronic switch. The switching characteristic of the molded case circuit breaker is shown at 61 and as can be appreciated from an examination of this curve, circuit breakers of this type provide no substantial current limiting function in that the full available current of 300 amperes is allowed to continue through the device after detection of overload condition for a period of 11 to 12 milliseconds. Likewise, the current limiting fuse whose characteristic is illustrated at 62 does not provide an effective current limiting function in that the full available current of 300 amperes is allowed to pass through the device for a period of 2 milliseconds. In contrast to these two presently available devices, the switching time of the controlled rectifier switch of FIGURE 1 is illustrated at 63. For the purpose of clarification, because the time period is so short, this characteristic has been blown up in the encircled portion. It can be appreciated from an examination of this curve that the controlled rectifier electronic switch does perform a current limiting function after detection of an overload condition in that the overload current is allowed to rise only to a value of 20–30 amperes maximum value, even though a full 300 amperes current is available, and conduction through the device is cut off after only a period of 40 microseconds. Accordingly, it can be appreciated that applicant's device does constitute a current limiting device in that it prevents overload current values from even attaining the full available line current value after detection of an overload condition. It should be understood that the values cited are exemplary of one embodiment of a switch constructed in accordance with the invention, and that the switch can be constructed to accommodate a wide variety of power levels, etc. Hence, the switch is in no way restricted to construction in a manner to provide the above mentioned operating characteristics for these can be improved upon greatly.

In the event that an overcurrent having a relatively small magnitude is continued over the preset period, it will heat the overcurrent sensing resistor 13 which is thermally coupled to the resistor 49. As the thermally sensitive resistor 49 heats its resistance increases and the potential on the diode 52 is increased to a value such that ultimately it is rendered conductive and produces a current pulse in the primary winding 45 of the pulse transformer. This induces a triggering pulse in the secondary winding 44 which is connected through diode 43 to the control gates of each of the controlled rectifiers 15 and 19 to thereby turn off the switching circuit. The period of time required for the thermally sensitive resistor 49 to turn Off the switch is calibrated to provide safe overload operating conditions for whatever equipment is controlled by the switch. For example, it may be designed to provide a period of 30 seconds' operation at the overcurrent value without endangering equipment controlled by the switch. In this manner, inverse time overload current protection is provided for the circuit in which the switch is used.

Figure 3:
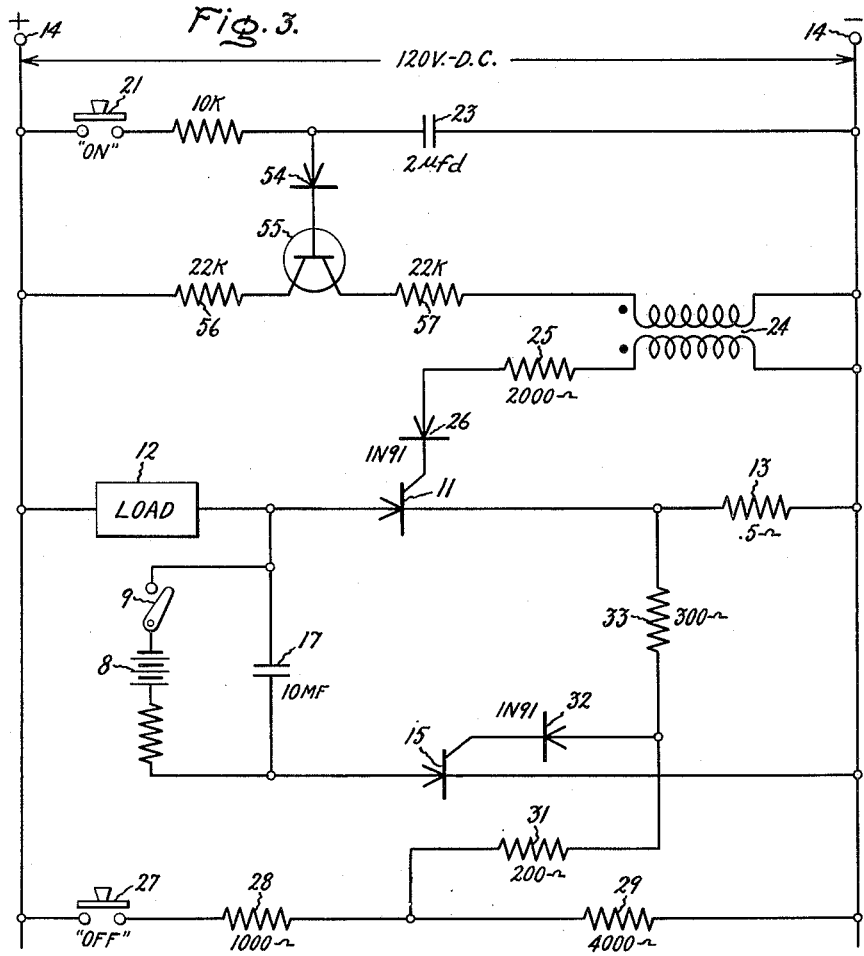
FIGURE 3 is a schematic circuit diagram of a second embodiment of a new and improved electronic switch constructed in accordance with the invention, and which includes an improved anti-chatter switching circuit.

A second embodiment of an electronic switch constructed in accordance with the invention is shown in FIGURE 3 of the drawings. In FIGURE 3, like parts of the switch described with respect to FIGURE 1 of the drawings have been given the same reference numbers, and function in the same manner as they do in the arrangement of FIGURE 1. The electronic switch of FIGURE 3 comprises a first controlled rectifier 11 connected in series circuit relationship with a load 12 and an overload sensing impedance formed by a comparatively small resistor 13. The series circuit thus comprised is connected across a pair of terminals 14 which in turn are adapted to be connected across a source of direct current electric energy such as 120 volt direct current supply. A second silicon controlled rectifier 15 is connected in series circuit relationship with a quenching capacitor 17, and the series circuit thus formed is connected between the negative end of the load 12 and the negative terminal 14 in parallel with the first controlled rectifier 11. The quenching capacitor 17 is initially charged by a charging circuit formed by a battery 8 and switch 9 connected in series circuit with a suitable limiting resistor across the quenching capacitor 17 with the polarities arranged so that the capacitor plate connected to rectifier 15 is charged positively. By this arrangement, upon the knife switch 9 being closed, the quenching capacitor 17 will be initially charged to some predetermined value by battery 8.

An On triggering circuit is operatively coupled to the control gate element of the first controlled rectifier 11 for gating on this rectifier. This On triggering circuit is formed by a pushbutton switch 21 connected in series with a capacitor 23 that serves as a pulse forming network to develop a short time duration switching pulse upon the pushbutton switch 21 being depressed. The juncture of the switch 21 and capacitor 23 is connected through an isolating diode 54 to the emitter electrode of a unijunction transistor 55. The unijunction transistor 55 has one base electrode connected through a biasing resistor 56 to the positive terminal of the direct current power supply, and has a second base electrode connected through a limiting resistor 57 and the primary winding of the pulse transformer 24 to the positive terminal 14. If desired, the primary winding of transformer 24 may have a resistor connected across it which would serve to increase the impedance of the primary winding of the pulse transformer 24 so that voltage transients which might occur upon a source of electric energy being connected to the input terminals 14, or similar cause, will not induce a sufficiently large current pulse in the secondary winding of the pulse transformer 24 to trigger the controlled rectifier 11. The secondary winding of the pulse transformer 24 is connected through a limiting resistor 25 and protective diode 26 to the control gate element of the rectifier 11. By this arrangement upon the pushbutton switch 21 being depressed the capacitor 23 will be charged to a potential sufficient to turn on transistor 55, and thereby induce a triggering On pulse in the secondary winding of the pulse transformer 24. This triggering On pulse is applied through the limiting resistor 24 and protective diode 26 to the control gate element of the controlled rectifier 11. It should be noted that the unijunction transistor 55 will be turned on only after the capacitor 23 has attained a predetermined charge. Thus, should the contacts of switch 21 chatter, which is possible with any mechanical contact switch, then only one triggering pulse will be induced, since the unijunction will remain on until capacitor 23 is discharged. The time constant of this discharge is related to the charging time of quenching capacitor 17 to assure that the circuit is always in a condition of readiness to interrupt current flow through the load.

A triggering Off circuit is provided for turning Off the electronic switch when desired, and includes a second pushbutton switch 27 connected in series circuit relationship with a pair of voltage dividing resistors 28 and 29 across the terminals 14. The juncture of the voltage dividing resistors 28 and 29 is connected through a limiting resistor 31 and protective diode 32 to the control gate element of the second silicon controlled rectifier 15. For a purpose to be described more fully hereinafter, the control gate of controlled rectifier 15 is also connected through a second limiting resistor 33 to the positive side of the small overload current sensing resistor 13. In order to isolate the Off triggering circuit from the load carrying elements of the electronic switch, an isolating diode and a Zener diode (not shown) may be connected between the positive voltage end of resistor 13 and the gating circuit of controlled rectifier 15. To turn off the electronic switch, closing of the pushbutton switch 27 produces a positive potential at the juncture of resistors 28 and 29 which is supplied through resistor 31 and diode 32 to the control gate element of the controlled rectifier 15 to gate this rectifier On. Upon this occurrence, the charge on the quenching capacitor 17 causes a reverse current flow through the controlled rectifier 11 which is adequate to drop the total load current through the controlled rectifier below its holding value and thereby turns Off the rectifier.

In addition to the above features, the electronic switch of FIGURE 3 includes the overload current sensing resistor 13 which is coupled through a limiting resistor 33 to the control gate element of the control rectifiers 15 and 19. By this arrangement, should an overcurrent be drawn through the load 12 it will produce an error potential across the overload sensing resistor 13 that is coupled through the limiting resistor 33 and protective diode 32 to the control gate element of controlled rectifier 15 to thereby turn off the main load current carrying controlled rectifier 11 in the previously described manner.

From the foregoing description it can be appreciated that the present invention provides a new and improved electronic switch which does not employ or require any mechanically moving parts in its load current carrying branches, and which operates at extremely fast rates. Because of this characteristic the switch can be incorporated as a current limiting element in a circuit. Further, by connecting the switch to various control sensing elements, the switch can be readily modified to respond to any desired control phenomenon coupled to the switch through appropriate transducers. If desired, a thermally sensitive resistor can be easily incorporated in the circuit to provide inverse time overload protection. Additionally, by inclusion of simple anti-chatter components in the switching circuit, undesired effects due to chatter in the switch contacts can be overcome readily.

Having described several embodiments of a new and improved electronic switch constructed in accordance with the invention, it is believed obvious that other modifications and variations of the invention are possible in the light of the above teachings. It is therefore to be understood that changes may be made in the particular embodiments of the invention described which are within the full intended scope of the invention as defined by the appended claims.

What I claim as new and desire to secure by Letters Patent of the United States is:

1. A switching circuit including in combination a pair of controlled rectifiers each having control gate elements, a first one of said controlled rectifiers being adapted to be connected in series circuit relationship with a load device across a source of electric energy, a quenching circuit including a quenching capacitor connected in series circuit relationship with said remaining controlled rectifier and adapted to divert load current from said first controlled rectifier, a charging device connected in circuit relationship with said quenching capacitor for precharging said quenching capacitor with a potential having a polarity such that its negatively charged plate is connected to the positive electrode of said first mentioned controlled rectifier, an On triggering circuit coupled to the gate element of the first controlled rectifier for switching the circuit to its On conditition, an Off triggering circuit coupled to the gate element of the remaining controlled rectifier for turning On said remaining controlled rectifier and thereby switch the circuit to its Off condition, and an overload sensing device connected in series circuit relationship with the load device for sensing an overload condition instantaneously, said overload sensing device being electrically coupled to the control gate element of said remaining controlled rectifier for turning off the circuit instantaneously in response to an overload condition.

2. The combination set forth in claim 1 wherein said overload sensing device comprises a resistor and further characterized by a thermally sensitive impedance element thermally coupled to the overload sensing resistor and electrically coupled to the control gate element of said remaining controlled rectifier.

3. A switching circuit including in combination a pair of controlled rectifiers each having control gate elements, said pair of controlled rectifiers being adapted to be connected in parallel circuit relationship across a source of electric energy, a load device connected in series circuit relationship with the first of said controlled rectifiers, a quenching circuit including a quenching capacitor adapted to be connected across the source of electric energy with the quenching capacitor being connected in series circuit relationship with said remaining controlled rectifier and adapted to divert load current from said first controlled rectifier, means for precharging said quenching capacitor with a potential having a polarity such that its negatively charged plate is connected to the positive electrode of the first controlled rectifier, an isolating device connected in said last mentioned series circuit for isolating said quenching capacitor from said load, an On triggering circuit coupled to the gate element of the first controlled rectifier for switching the circuit to its On condition, an Off triggering circuit coupled to the gate element of the remaining controlled rectifier for turning On said remaining controlled rectifier and thereby switch the circuit to its Off condition, means for gating on said isolating device in response to said Off triggering circuit being actuated, and an overload sensing impedance connected in series circuit relationship with the load device for sensing an overload condition instantaneously, said overload sensing impedance being electrically coupled to the control gate element of said remaining controlled rectifier and to said means for gating on the isolating device for actuating the same.

4. The combination set forth in claim 3 further characterized by a thermally sensitive impedance element thermally coupled to the overload sensing impedance and electrically coupled to the control gate element of said remaining controlled rectifier and to said means for gating the isolating device on for actuating the same.

5. A switching circuit including in combination a pair of controlled rectifiers each having control gate elements, said pair of controlled rectifiers being adapted to be connected in parallel circuit relationship across a source of electric energy, a load device connected in series circuit relationship with the first one of said controlled rectifiers, a quenching circuit including a quenching capacitor connected in series circuit relationship between a pair of voltage dividing impedances, said quenching circuit being adapted to be connected across the source of electric energy with the quenching capacitor being connected in series circuit relationship with said second controlled rectifier and adapted to divert load current from said first controlled rectifier, a third controlled rectifier connected in said last mentioned series circuit between the quenching capacitor and the load for isolating the quenching capacitor from the load, an On triggering circuit adapted to be connected across the source of electric energy and including a switch connected in circuit relationship with a pulse forming circuit that is connected to the control gate of the first controlled rectifier, an Off triggering circuit comprising a switch and a pair of series connected impedances, said Off triggering circuit being adapted to be connected across said source of electric energy with the juncture of the impedances being connected to the control gate element of the remaining one of the said pair and to the control gate element of said third controlled rectifier, and an overload sensing impedance connected in series circuit relationship with the load device for sensing an overload condition instantaneously, said overload sensing impedance being electrically coupled to the control gate element of the remaining one of said pair of controlled rectifiers and to the control gate element of said third controlled rectifiers.

6. The combination set forth in claim 5 further characterized by a thermally sensitive impedance element thermally coupled to the overload sensing impedance and electrically coupled to the control gate element of the remaining one of said pair of controlled rectifiers and to the control gate element of said third controlled rectifier.

7. A switching circuit including in combination a pair of controlled rectifiers each having control gate elements, a first one of said controlled rectifiers being adapted to be connected in series circuit relationship with a load device across a source of electric energy, a quenching circuit including a quenching capacitor connected in series circuit relationship with said second controlled rectifier and adapted to divert load current from said first controlled rectifier, a charging device connected in circuit relationship with said quenching capacitor for precharging said quenching capacitor with a potential having a polarity such that its negatively charged plate is connected to the positive electrode of said first mentioned controlled rectifier, an On triggering circuit coupled to the gate element of the first controlled rectifier for switching the circuit to its on condition, said On triggering circuit comprising a pulse transformer having its secondary winding operatively coupled to the control gate element of said first controlled rectifier and the primary winding connected in series circuit relationship with a pulse forming circuit comprised by a unijunction transistor having its emitter electrode connected to a switch and charging capacitor connected in series circuit relationship across the source of electric energy to be switched, an Off triggering circuit coupled to the gate element of the remaining controlled rectifier for turning on said remaining controlled rectifier and thereby switch the circuit to the off condition, and an overload sensing impedance connected in series circuit relationship with the load device for sensing an overload condition instantaneously, said overload sensing impedance being electrically coupled to the control gate element of said remaining controlled rectifier for turning off the circuit instantaneously in response to an overload condition.

References Cited in the file of this patent

UNITED STATES PATENTS

| | | |
|---|---|---|
| 1,421,170 | Chubb | June 27, 1922 |
| 2,372,106 | Nagel | Mar. 20, 1945 |
| 2,808,471 | Poucel et al. | Oct. 1, 1957 |